(12) United States Patent
Becker et al.

(10) Patent No.: US 12,113,183 B2
(45) Date of Patent: Oct. 8, 2024

(54) METHOD FOR OPERATING AN ELECTRICAL ENERGY STORE

(71) Applicant: Robert Bosch GmbH, Stuttgart (DE)

(72) Inventors: Jens Becker, Benningen am Neckar (DE); Triantafyllos Zafiridis, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 700 days.

(21) Appl. No.: 17/312,752

(22) PCT Filed: Dec. 6, 2019

(86) PCT No.: PCT/EP2019/083966
§ 371 (c)(1),
(2) Date: Jun. 10, 2021

(87) PCT Pub. No.: WO2020/120311
PCT Pub. Date: Jun. 18, 2020

(65) Prior Publication Data
US 2022/0059879 A1    Feb. 24, 2022

(30) Foreign Application Priority Data

Dec. 12, 2018  (DE) .................. 10 2018 221 501.4

(51) Int. Cl.
*H01M 10/44*  (2006.01)
*H02J 7/00*  (2006.01)

(52) U.S. Cl.
CPC ............. *H01M 10/44* (2013.01); *H02J 7/005* (2020.01); *H02J 7/00712* (2020.01); *H01M 2220/20* (2013.01)

(58) Field of Classification Search
CPC ....... H01M 10/44; H02J 7/005; H02J 7/00712
See application file for complete search history.

(56) References Cited

U.S. PATENT DOCUMENTS

| | | |
|---|---|---|
| 2016/0006286 A1 | 1/2016 | Khandelwal et al. |
| 2016/0172886 A1 | 6/2016 | Keates |
| 2018/0248396 A1 | 8/2018 | Keates |
| 2018/0321730 A1* | 11/2018 | Mandli ............... H02J 7/0013 |

FOREIGN PATENT DOCUMENTS

| | | | |
|---|---|---|---|
| DE | 102009042656 A1 * | 3/2011 | ......... B60L 11/1857 |
| DE | 102014212451 A1 | 12/2015 | |

OTHER PUBLICATIONS

Translation of International Search Report for Application No. PCT/EP2019/083966 dated Mar. 25, 2020 (2 pages).

* cited by examiner

*Primary Examiner* — Minh Q Phan
(74) *Attorney, Agent, or Firm* — Michael Best & Friedrich LLP

(57) ABSTRACT

The presented invention relates to a method for operating an electrical energy store, the ageing behaviour of which is estimated by means of an expected ageing profile, wherein a rapid-charging profile, which is to be used, of the electrical energy store is ascertained depending on a comparison between a detected state of ageing of the electrical energy store and a desired state of ageing, which is determined by means of the expected ageing profile, of the electrical energy store.

11 Claims, 2 Drawing Sheets

METHOD FOR OPERATING AN ELECTRICAL ENERGY STORE

BACKGROUND OF THE INVENTION

Electrical energy stores such as, for example, batteries which are used, inter alia, in electric or hybrid vehicles are subject to a certain amount of ageing. This ageing can generally be described by two components, namely a calendar-based component and a cyclical component. The cyclical ageing is caused by charge throughput, i.e. by the use of the electrical energy store. Using the example of a lithium-ion battery, the charging operation is a considerable factor in the ageing. Precisely in this case, the relationship is also true whereby the more quickly a charging operation is performed, the greater the ageing of the lithium-ion battery within this time period.

For the operation of lithium-ion batteries as are currently used in electric vehicles, so-called quick-charge profiles are stored, which enable quick-charging in a defined time with a defined level of ageing. The quick-charge profiles are established by means of series of tests in a laboratory. In general, the batteries are designed such that only a preset number of charge cycles planned over the entire life can be a quick-charge operation. Thus, a battery can be designed overall, for example, for 200 quick-charge cycles in the case of 1000 charge cycles. If this proportion is exceeded, the battery ages more quickly than intended. Likewise, additional influences, such as, for example, aggressive discharge operations or high temperatures can accelerate the ageing. If a battery ages more quickly than intended, it may need to be replaced before the planned end of life is reached.

The relevant prior art is known from US 2016/0172886 and US 2016/0006286.

BACKGROUND OF THE INVENTION

The method according to the invention for operating an electrical energy store, the ageing behavior of which has been estimated by means of an expected ageing characteristic, has the advantage over the prior art that a quick-charge profile to be used of the electrical energy store is determined depending on a comparison between a detected state of ageing of the electrical energy store and a setpoint state of ageing of the electrical energy store determined by means of the expected ageing characteristic. The electrical energy store may be, in particular, a battery, in particular a lithium-ion battery.

It is advantageous that the determination of the quick-charge profile to be used takes place by virtue of the quick-charge profile to be used being selected from among a multiplicity of stored quick-charge profiles which differ in terms of their influence on the ageing behavior of the electrical energy store. Therefore, the method can be implemented in a particularly simple manner.

It is advantageous that the quick-charge profile to be used is determined in such a way that a future discrepancy between the detected state of ageing of the electrical energy store and the setpoint state of ageing of the electrical energy store determined by means of the expected ageing characteristic is less than an associated discrepancy between the detected state of ageing of the electrical energy store and the setpoint state of ageing of the electrical energy store determined by means of the expected ageing characteristic, which discrepancy would be to be expected when using a standard quick-charge profile. The standard quick-charge profile may be, in particular, a quick-charge profile which enables charging of the electrical energy store, for example a battery, which is as quick as possible. An associated discrepancy is in this case in particular the discrepancy at the time point of the predicted future discrepancy.

It is advantageous that the quick-charge profile to be used is determined in such a way that the state of ageing of the electrical energy store detected at a future horizon time point corresponds to an associated state of ageing determined from the expected ageing characteristic. In other words, the quick-charge profile to be used is selected in such a way that, after one or more quick-charge operations performed using the quick-charge profile to be used, the detected state of ageing of the electrical energy store again corresponds to the expected state of ageing. If the electrical energy store were to age more quickly than planned, it is therefore advantageously possible to intervene in correcting fashion in the ageing characteristic of the electrical energy store and therefore reproduce a setpoint ageing behavior of the electrical energy store. A horizon time point can in this case be understood to mean any future time point which is in the future at least for the duration of a quick-charge operation. Advantageously, the horizon time point is far in the future such that a plurality of quick-charge operations can be performed using the quick-charge profile to be used until the horizon time point is reached.

It is advantageous that a user of the electrical energy store, in particular a user of an electric vehicle in which a battery is installed, can select the quick-charge profile to be used from among a selection of available quick-charge profiles. Therefore, the user advantageously has the option of determining himself how far in the future the horizon time point should be. In other words, the user of the electrical energy store can himself determine how many quick-charge cycles need to be performed using the quick-charge profile to be used until the detected state of ageing of the electrical energy store again corresponds to the state of ageing determined from the expected ageing characteristic. By virtue of the selection of the number of quick-charge cycles to be used, the user of the electrical energy store therefore has the direct possibility of selecting how long quick-charge operations using the quick-charge profile to be used last in the future since there is a direct relationship between a duration of a quick-charge operation and a positive effect on the state of ageing of the electrical energy store. The available quick-charge profiles can in this case, in an advantageous configuration, be identical to the multiplicity of stored quick-charge profiles.

It is advantageous that, prior to the selection of the quick-charge profile to be used, the horizon time point or an item of selection information, which correlates with the horizon time point, of the available the quick-charge profiles is displayed to the user of the electrical energy store. The horizon time point of the available quick-charge profiles is in this case the time at which it can be assumed that the detected state of ageing of the electrical energy store, by virtue of the quick-charge profiles to be used, again corresponds to the setpoint state of ageing of the electrical energy store determined by means of the expected ageing characteristic. A correlating item of selection information can in this case be any variable which correlates with the horizon time point, for example, the individual influence of a quick-charge profile on the state of ageing of the electrical energy store or, since there is a physical correlation here, the duration of a complete quick-charge operation using the respective quick-charge profile.

Advantageously, the electrical energy store comprises a battery of an electric vehicle since the proposed method is particularly suited for operation of a lithium-ion battery of an electric vehicle.

An apparatus which is designed to perform each step of the method according to the invention is advantageous. A computer program which is designed to perform each step of the method according to the invention when the computer program is running on an arithmetic and logic unit is also advantageous. The arithmetic and logic unit may be, for example, a control unit of the electrical energy store, such as, for example, a battery management system (BMS) of a battery.

Advantageously, within the scope of the proposed method, quick-charge profiles are used which have been determined in advance in a laboratory.

As an alternative to the consideration of the state of ageing of the electrical energy store, also an ageing gradient, i.e. also a change in the state of ageing per unit time of the electrical energy store, can be considered and used as a basis for the proposed method. It is likewise conceivable not to perform the proposed method using defined time points such as, for example, a horizon time point, but to use a total amount of charge which has flowed through the electrical energy store as the reference system. Likewise, a total number of charging operations of the electrical energy store can be used as reference system.

The state of ageing of the electrical energy store may be, for example, a state of health capacity ($SOH_C$), in particular when the electrical energy store is a battery. Methods for determining the $SOH_C$ are sufficiently well known from the prior art.

Advantageously, the proposed method is performed using an ageing controller, wherein the ageing controller may be, for example, a software module. With the aid of the ageing controller, a degradation factor (DegFac) can be determined which is used for reducing the ageing of the electrical energy store. The degradation factor is calculated as follows:

$$DegFac = \frac{Q_{HOR}}{Q_{est}} = \frac{AG_{set} * SOH_{HOR}}{(SOH_{set} - SOH_{meas} + SOH_{HOR}) * AG_{est}}$$

SOH denotes the state of health, i.e. a measure of the ageing of the electrical energy store. $Q_{HOR}$ denotes a charge throughput, which is constant throughout the life of the electrical energy store. The charge throughput $Q_{HOR}$ is the product of the ageing gradient and an ageing horizon. The ageing horizon is the difference between two state of health values at different time points. The index meas denotes measured variables. The index est denotes estimated variables. $AG_{set}$ denotes an ageing gradient to be expected for the electrical energy store, wherein the following applies:

$$AG_{set} = \frac{Q_{max}}{SOH_{BOL} - SOH_{EOL}}$$

Qmax is the charge throughput over the life of the electrical energy store, for example, a battery, from the beginning of the expected life (BOL) to the end of the expected life (EOL). A present ageing gradient $AG_{est}$ is determined as the Quotient of the measured charge throughput and the measured loss of capacity, as follows:

$$AG_{est} = \frac{\Delta Q_{meas}}{\Delta SOH_{est}}$$

An exemplary embodiment of the invention will be set forth in more detail below. In the drawings:

DETAILED DESCRIPTION

Figure 1:
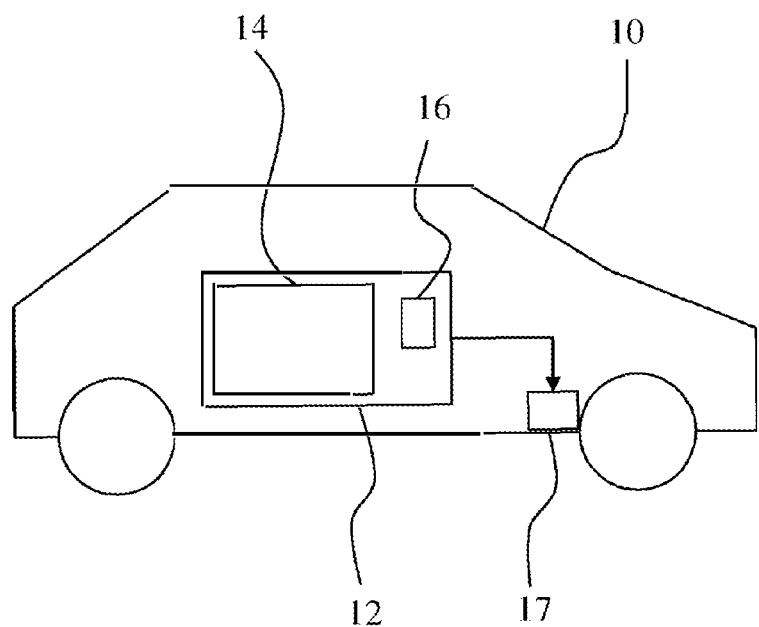
FIG. 1 shows a schematic illustration of an electric vehicle.

FIG. 1 shows a schematic illustration of an electric vehicle (10), which comprises an electric motor (17) and an electrical energy store (12). The electrical energy store (12) comprises a storage cell (14) and a control unit (16). The electrical energy store may be in particular a lithium-ion battery. The proposed method is particularly suitable for operation of a battery of an electric vehicle.

Figure 2:
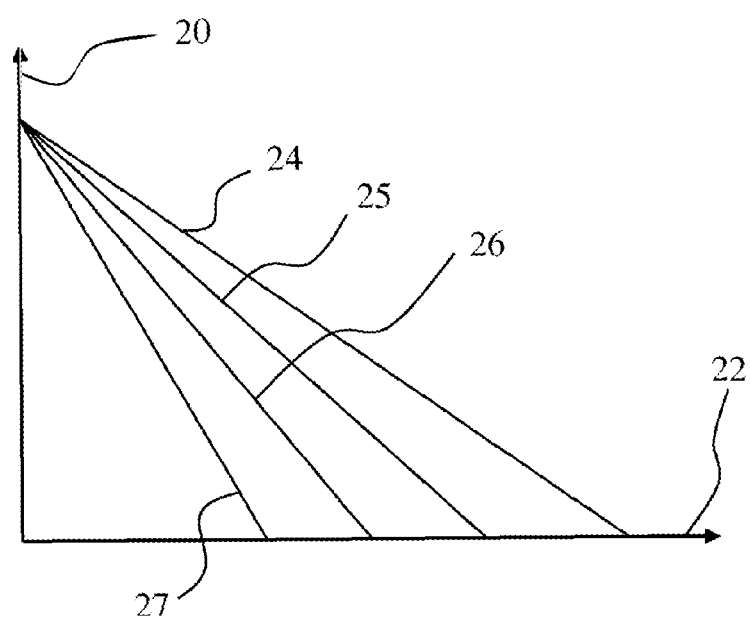
FIG. 2 shows a schematic illustration of the respective influence of various quick-charge profiles on the ageing behavior of an electrical energy store.

FIG. 2 shows a schematic illustration of the respective influence of various quick-charge profiles on the ageing behavior of the electrical energy store (12). The reference symbol 20 in this case denotes a state of ageing axis or a state of health axis, wherein a low value on the state of ageing axis corresponds to a high level of ageing. The reference symbol 22 denotes a time axis. Alternatively, the axis 22 may also be a charge axis, on which an accumulated total charge which flows through the electrical energy store (12) over the course of the life is plotted. Alternatively, the axis 22 may be a charge cycle axis, on which a sum of charge cycles performed or to be performed of the electrical energy store (12) is plotted.

A first quick-charge profile (24) has a first influence on the ageing behavior of the electrical energy store (12). As shown in FIG. 2, the state of health reduces over the course of time. A second quick-charge profile (25) has a second influence on the ageing behavior of the electrical energy store (12). A third quick-charge profile (26) has a third influence on the ageing behavior of the electrical energy store (12). A fourth quick-charge profile, which corresponds to a standard quick-charge profile, has a fourth influence on the ageing behavior of the electrical energy store (12). As can be seen in FIG. 2, the influence of the standard quick-charge profile (27) is such that, when using the standard quick-charge profile for quick-charge operations of the electrical energy store (12), a low state of health (SOH) is reached at a relatively early time point, whereas, when using, for example, the first quick-charge profile (24), the same state of health (SOH) would be reached at a later time point.

Figure 3:
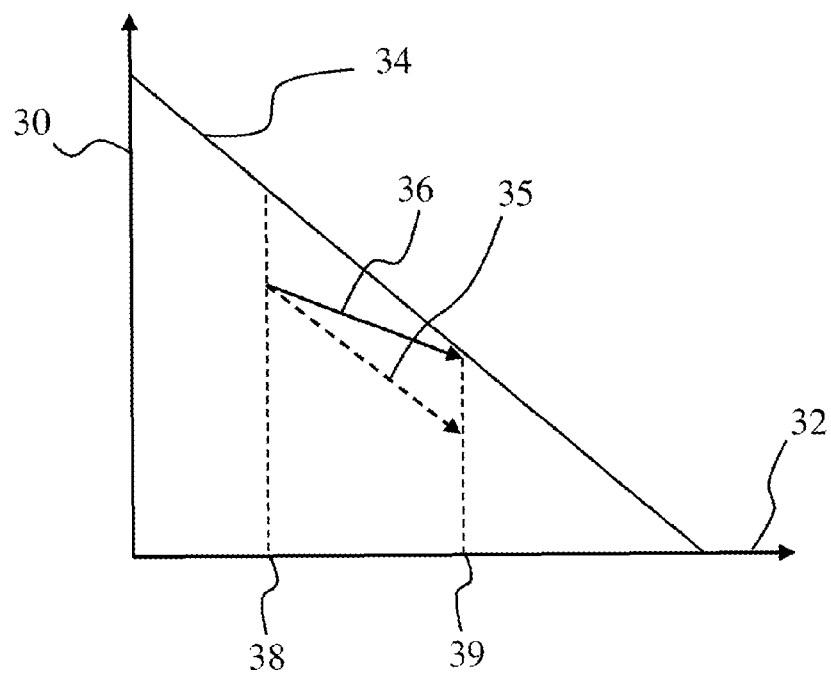
FIG. 3 shows a schematic illustration of the effect of the use of a quick-charge profile to be used on the state of ageing of the electrical energy store.

FIG. 3 shows a schematic illustration of the effect of the use of a quick-charge profile to be used on the state of ageing of the electrical energy store (12). The reference symbol 30 again denotes a state of ageing axis or a state of health axis. The reference symbol 32 again denotes a time axis or a charge axis or a charge cycle axis. The function 34 illustrates an expected ageing characteristic, i.e. a decrease in the state of health of the electrical energy store (12) as time continues. At a first time point (38), in the example illustrated in FIG. 3, the actual state of ageing of the electrical energy store (12) is detected. In this case, a state of health is determined which corresponds to the starting point of the arrows provided with the reference symbols 35 and 36. The state of health of the electrical energy store (12) which is determined at the first time point (38) is in this case below the setpoint state of ageing of the electrical energy store (12) determined using the expected ageing characteristic (34), which corresponds to the value of the expected ageing characteristic (34) at the first time point (38).

Continued operation of the electrical energy store when using the standard quick-charge profile (27) would result in a detected state of ageing of the electrical energy store (12) at the horizon time point (39) which corresponds to an end point of the arrow denoted by reference symbol 35. That is to say that continued operation of the electrical energy store (12) when using the standard quick-charge profile (27) would result in there still being, at the horizon time point (39), a discrepancy between the detected state of ageing and the setpoint state of ageing, which corresponds to the value of the expected ageing characteristic (34) at the horizon time point (39). When using a quick-charge profile to be used which, for example, may be the first quick-charge profile (24), it is possible to ensure that, at the horizon time point (39), the detected state of ageing of the electrical energy store (12) again corresponds to the expected ageing characteristic (34) at the horizon time point (39). This is possible since the influence of the quick-charge profile to be used, for example, the first quick-charge profile (24), on the ageing behavior of the electrical energy store (12) is less than the influence of the standard quick-charge profile (27).

Figure 4:
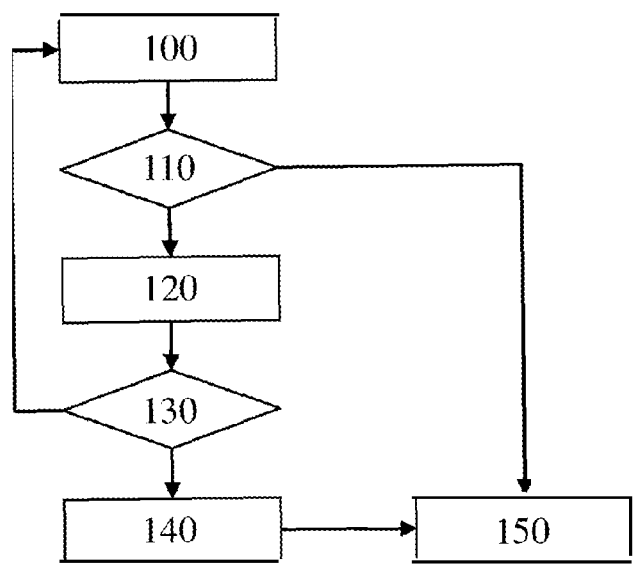
FIG. 4 shows a schematic flowchart of an exemplary embodiment of the method according to the invention.

FIG. 4 shows a schematic flowchart of an exemplary embodiment of the method according to the invention. The exemplary embodiment starts with step 100, in which a quick-charge operation is initiated. The initiation of a quick-charge operation of the electrical energy store (12), which may be, in particular, a lithium-ion battery of an electric vehicle (10), can take place, for example, by connection of the electrical energy store (12) to a quick-charge charging station or by actuation of a corresponding actuation element. Step 110 follows on from step 100.

In step 110, a test is performed to ascertain whether the quick-charge profile to be used has been changed recently. A recent change may be, for example, a change which has been performed up to a few, predeterminable quick-charge cycles ago. For example, a test can be performed to ascertain whether a presently stored quick-charge profile has already been used 10 times for a quick-charge operation. If the test as part of step 110 gives the result that the quick-charge profile has been changed recently, step 150 follows on from step 110. If the test as part of step 110 gives the result that the quick-charge profile has not been changed recently, i.e., for example, that a stored quick-charge profile has already been used for 10 quick-charge cycles, step 120 follows.

In step 120, the state of ageing of the electrical energy store (12) is detected. For this purpose, for example, the state of health of the electrical energy store (12) can be determined in accordance with a method known from the prior art. As part of step 120, in addition, the setpoint state of ageing of the electrical energy store (12) is determined at the present time point. For this purpose, the expected ageing characteristic (34) of the electrical energy store (12) is evaluated at the present time point. Step 130 follows on from step 120.

In step 130, a comparison is performed between the state of ageing of the electrical energy store (12) detected in step 120 and the setpoint state of ageing of the electrical energy store (12) determined in step 120. If this comparison demonstrates a discrepancy which is greater than a predeterminable tolerance, step 140 follows on from step 130. If the comparison does not result in a discrepancy which is greater than a predeterminable tolerance, step 100 follows on from step 130.

In step 140, various quick-charge profiles and items of selection information, which correlate with the horizon time point, for the various quick-charge profiles are displayed to a user of the electrical energy store (12), which may be, in particular the lithium-ion battery of an electric vehicle (10). The items of selection information which correlate with the horizon time point may be, in particular, a number of quick-charge operations which need to be performed with the respective quick-charge profile in order to bring the detected state of ageing of the electrical energy store (12) back into congruence with the setpoint state of ageing of the electrical energy store (12). The items of selection information which correlate with the horizon time point (39) may also be, for example, the duration of a quick-charge operation which is necessary when using each quick-charge profile for charging of the electrical energy store (12). The user of the electrical energy store (12) then selects a quick-charge profile displayed to him. In an alternative configuration, the selection of the quick-charge profile as part of step 140 is not performed by a user, but by an arithmetic and logic unit, which implements the exemplary embodiment of the method according to the invention. Step 150 follows on from step 140.

In step 150, the quick-charge profile selected in step 140 is stored in a memory, and then a quick-charge operation is performed using the newly stored quick-charge profile. If, as part of step 150, no quick-charge profile has been newly stored, the quick-charge operation is performed using an already stored quick-charge profile.

By virtue of the proposed exemplary embodiment of the method according to the invention, the life of the electrical energy store (12), which may be in particular a lithium-ion battery, can be increased. Overloading of the electrical energy store (12) by excessively frequent quick-charging is identified by means of the proposed exemplary embodiment of the method according to the invention and compensated for by the use of a suitable quick-charge profile. A specified life expectancy of the electrical energy store (12) is therefore maintained. It is particularly advantageous that the proposed exemplary embodiment of the method according to the invention does not require any additional hardware but can be implemented merely by using suitable software.

The invention claimed is:

1. A method for operating an electrical energy store (12), the ageing behavior of which has been estimated by means of an expected ageing characteristic (34), the method comprising:

determining a quick-charge profile for the electrical energy store (12) depending on a comparison between a detected state of ageing of the electrical energy store and a setpoint state of ageing of the electrical energy store determined by means of the expected ageing characteristic;

wherein the quick-charge profile is determined in such a way that a future discrepancy between the detected state of ageing of the electrical energy store (12) and the setpoint state of ageing of the electrical energy store (12) determined by means of the expected ageing characteristic (34) is less than an associated discrepancy between the detected state of ageing of the electrical energy store (12) and the setpoint state of ageing of the electrical energy store (12) determined by means of the expected ageing characteristic (34), which discrepancy is to be expected when using a standard quick-charge profile (27).

2. The method as claimed in claim 1, wherein the determination of the quick-charge profile includes selecting from among a multiplicity of stored quick-charge profiles which differ in terms of their influence on the ageing behavior of the electrical energy store.

3. The method as claimed in claim 1, wherein the quick-charge profile is determined in such a way that the state of ageing of the electrical energy store detected at a future horizon time point (39) corresponds to an associated state of ageing determined from the expected ageing characteristic (34).

4. The method as claimed in claim 3, wherein a selection of available quick-charge profiles are presented to user of the electrical energy store (12).

5. The method as claimed in claim 4, wherein, prior to the selection of the quick-charge profile to be used, the horizon time point (39) or an item of selection information, which correlates with the horizon time point (39), of the available quick-charge profiles is displayed to the user of the electrical energy store (12).

6. The method as claimed in claim 1, wherein the electrical energy store (12) comprises a battery of an electric vehicle (10).

7. An apparatus, configured to
estimate an ageing behavior by means of an expected ageing characteristic (34);
determine a quick-charge profile for an electrical energy store (12) depending on a comparison between a detected state of ageing of the electrical energy store and a setpoint state of ageing of the electrical energy store determined by means of the expected ageing characteristic;
wherein the quick-charge profile is determined in such a way that a future discrepancy between the detected state of ageing of the electrical energy store (12) and the setpoint state of ageing of the electrical energy store (12) determined by means of the expected ageing characteristic (34) is less than an associated discrepancy between the detected state of ageing of the electrical energy store (12) and the setpoint state of ageing of the electrical energy store (12) determined by means of the expected ageing characteristic (34), which discrepancy is to be expected when using a standard quick-charge profile (27).

8. A non-transitory computer-readable media containing instructions that when executed by a computer cause the computer to
estimate an ageing behavior by means of an expected ageing characteristic (34);
determine a quick-charge profile for an electrical energy store (12) depending on a comparison between a detected state of ageing of the electrical energy store and a setpoint state of ageing of the electrical energy store determined by means of the expected ageing characteristic;
wherein the quick-charge profile is determined in such a way that a future discrepancy between the detected state of ageing of the electrical energy store (12) and the setpoint state of ageing of the electrical energy store (12) determined by means of the expected ageing characteristic (34) is less than an associated discrepancy between the detected state of ageing of the electrical energy store (12) and the setpoint state of ageing of the electrical energy store (12) determined by means of the expected ageing characteristic (34), which discrepancy is to be expected when using a standard quick-charge profile (27).

9. A method for operating an electrical energy store (12), the ageing behavior of which has been estimated by means of an expected ageing characteristic (34), the method comprising:
determining a setpoint state of ageing of the electrical energy store by means of the expected ageing characteristic (34);
detecting a stage of ageing of the electrical energy store;
comparing the state of ageing and the setpoint state of ageing to determine a real-time discrepancy;
selecting a quick-charge profile for the electrical energy store (12) based on the real-time discrepancy;
wherein in the event the quick-charge profile is different than a standard quick-charge profile, a future discrepancy between the detected state of ageing of the electrical energy store (12) and the setpoint state of ageing of the electrical energy store (12) is less than an associated discrepancy expected when using the standard quick-charge profile (27).

10. An apparatus, configured to:
determine a setpoint state of ageing of an electrical energy store by means of an expected ageing characteristic (34);
detecting a stage of ageing of the electrical energy store;
compare the state of ageing and the setpoint state of ageing to determine a real-time discrepancy;
select a quick-charge profile for the electrical energy store (12) based on the real-time discrepancy;
wherein in the event the quick-charge profile is different than a standard quick-charge profile, a future discrepancy between the detected state of ageing of the electrical energy store (12) and the setpoint state of ageing of the electrical energy store (12) is less than an associated discrepancy expected when using the standard quick-charge profile (27).

11. A non-transitory computer-readable media containing instructions that when executed by a computer cause the computer to:
estimate an ageing behavior by means of an expected ageing characteristic (34);
determine a setpoint state of ageing of an electrical energy store based on the expected ageing characteristic (34);
detecting a stage of ageing of the electrical energy store;
compare the state of ageing and the setpoint state of ageing to determine a real-time discrepancy;
select a quick-charge profile for the electrical energy store (12) based on the real-time discrepancy;
wherein in the event the quick-charge profile is different than a standard quick-charge profile, a future discrepancy between the detected state of ageing of the electrical energy store (12) and the setpoint state of ageing of the electrical energy store (12) is less than an associated discrepancy expected when using the standard quick-charge profile (27).

* * * * *